United States Patent
Glenn et al.

(10) Patent No.: US 7,073,481 B2
(45) Date of Patent: Jul. 11, 2006

(54) IN-CYLINDER COMBUSTION RECIPE FOR MEETING TIER 2 LOCOMOTIVE EMISSIONS REGULATIONS

(75) Inventors: W. Douglas Glenn, Erie, PA (US); Eric Dillen, Erie, PA (US); Shawn Gallagher, Erie, PA (US); Prakash Bedapudi, Erie, PA (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 10/249,874

(22) Filed: May 14, 2003

(65) Prior Publication Data

US 2003/0221676 A1 Dec. 4, 2003

(51) Int. Cl.
*F02D 31/00* (2006.01)
*F02M 37/04* (2006.01)

(52) U.S. Cl. ............... 123/305; 123/501; 123/357; 123/311

(58) Field of Classification Search ............... 123/294, 123/295, 299, 300, 305, 445, 472, 501, 357, 123/311, 316
See application file for complete search history.

(56) References Cited

U.S. PATENT DOCUMENTS

| | | | | |
|---|---|---|---|---|
| 5,819,702 A | * | 10/1998 | Mendler | 123/311 |
| 6,234,134 B1 | * | 5/2001 | Bedapudi et al. | 123/193.3 |
| 6,314,937 B1 | * | 11/2001 | Bedapudi et al. | 123/305 |
| 6,318,308 B1 | | 11/2001 | Hsu et al. | |
| 6,443,125 B1 | * | 9/2002 | Mendler | 123/316 |

FOREIGN PATENT DOCUMENTS

JP 9-228838 * 9/1997

OTHER PUBLICATIONS

Feb. 2003, pp. 1-2, GE's Tier 2 Locomotive Might Pay For Itself In Fuel Economy/Operating Gains Diesel Fuel News XP008036696.
Mar. 2003, pp. 1-18, Engine Design For Low Emissions Dieselnet Technology Guide XP001172609.
Online 2002, pp. 1-6, Engine Design For Nox Control Dieselnet Technology Guide XP001116165.
Online 2002, pp. 1-22, Engine Design For PM Control Dieselnet Technology Guide XP001116255.

* cited by examiner

*Primary Examiner*—Hai Huynh
(74) *Attorney, Agent, or Firm*—William Scott Andes; David G. Maire; Beusse Brownlee Wwolter Mora & Maire, PA

(57) ABSTRACT

A diesel engine (E) has a combustion chamber (C), a piston (T) movable in the chamber, air intake and exhaust valves (IV, EV), and a nozzle (N) injecting fuel into the combustion chamber. By controlling characteristics of an air-fuel mixture, emissions produced by combustion of the air-fuel mixture in the chamber are reduced to levels which satisfy the Tier 2 requirements established by the Environmental Protection Agency (EPA) for the engine. This may include controlling hydraulic flow characteristics through the nozzle, increasing the compression ratio within the combustion chamber, lowering the manifold air temperature (MAT), and retarding the start of fuel injection (SOI) within the chamber.

23 Claims, 8 Drawing Sheets

IN-CYLINDER COMBUSTION RECIPE FOR MEETING TIER 2 LOCOMOTIVE EMISSIONS REGULATIONS

CROSS REFERENCE TO RELATED APPLICATIONS

None.

FEDERAL RESEARCH STATEMENT

Not Applicable.

BACKGROUND OF INVENTION

This invention relates to diesel engines for locomotives and the like; and, more particularly, to diesel engines whose emissions must meet Tier 2 emissions standards promulgated by the Environmental Protection Agency (EPA).

In a diesel engine, fuel is directly injected into a cylinder of compressed air at a high temperature. The fuel is broken up into droplets which evaporate and mix with the air forming a combustible mixture. Products of combustion of this mixture are exhaust emissions that include hydrocarbons (HC), nitrogen oxides (NOx), carbon monoxide (CO), and particulate matter (PM). To reduce the amount of pollution in the atmosphere, the EPA regulates the emission level of these various exhaust products that is acceptable. Over time, the acceptable levels of emissions have changed. For locomotive diesel engines, the newest standards for emissions for locomotives manufactured on or after Jan. 1, 2005 are referred to as Tier 2 standards. These standards were published in the Federal Register, Vol. 63, No. 73 on Thursday, Apr. 16, 1998. The Tier 2 emission limits (in grams/horsepower/hour) for a line haul locomotive are as follows:

| | |
|---|---|
| hydrocarbons (NC) | 0.30 |
| carbon monoxide (CO) | 1.5 |
| oxides of nitrogen ($NO_3$) | 5.5 |
| particulate matter (PM) | 0.20 |
| steady state smoke (ss) | 20 |
| 30-second transient smoke | 40 |
| 3 second transient smoke | 50. |

Attainment of these standards involves consideration of a number of factors relating to engine operation. These include such things as injection pressure and injection timing, nozzle spray patterns, hydraulic flow, manifold air temperature, compression ratio, and air/fuel ratios. As will be appreciated by those skilled in the art, changes to effect reduction of one type of emission may well result in an increase in another emission component. For example, retarding fuel injection timing, which effectively reduces NOx, also effects engine performance and increases CO and PM. Other attempts to reduce PM result in an increase in fuel consumption which is also undesirable. In co-pending, co-assigned United States patent application (serial number), there is described a method of operating a locomotive diesel engine so as to meet the Tier 2 NOx requirements.

It is desirable, therefore, to effect a strategy for in-cylinder combustion which satisfies the Tier 2 requirements for PM, in addition to those for NOx, while at the same time maintaining an acceptable level of engine performance including fuel consumption. Importantly, the strategy for meeting Tier 2 requirements for PM, while continuing to satisfy the Tier 2 NOx requirements, should be done without the need for after treatment of the combustion products such as by scrubbing, or otherwise treating the exhaust. Such techniques add cost to the engine, take up space that may not be readily available in confined areas where the engine is installed, and adds to the maintenance requirements for the engine. Rather it is important to achieve the Tier 2 levels solely by controlling engine operation.

SUMMARY OF INVENTION

Briefly stated, the present invention is directed to a method for improving and improvements in the operation of a locomotive diesel engine so as to reduce PM produced by the combustion of an air/fuel mixture. The reduction is to a level which meets or surpasses EPA Tier 2 requirements for such emissions. While satisfying the requirements for PM, the method and apparatus of the invention further maintains the NOx emissions also produced at levels which also meet or surpass Tier 2 requirements for NOx.

Implementation of the invention does not require the use of post-combustion treatment of the engine's exhaust and thus does not significantly add to the cost of operating and maintaining the engine.

The method of the invention first involves reducing the air temperature (MAT) in the diesel engine's intake manifold. Next, the method includes an increase in the compression ratio. Third, the method includes increasing reducing hydraulic flow of fuel into the cylinder. Fourth, the method involves retarding the start of injection (SOI) of fuel into the cylinder. With respect to controlling hydraulic flow, the hole size (diameter) of a nozzle used to inject fuel into the cylinder is substantially reduced, this reduction in size producing an decrease in hydraulic flow of fuel into the cylinder.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
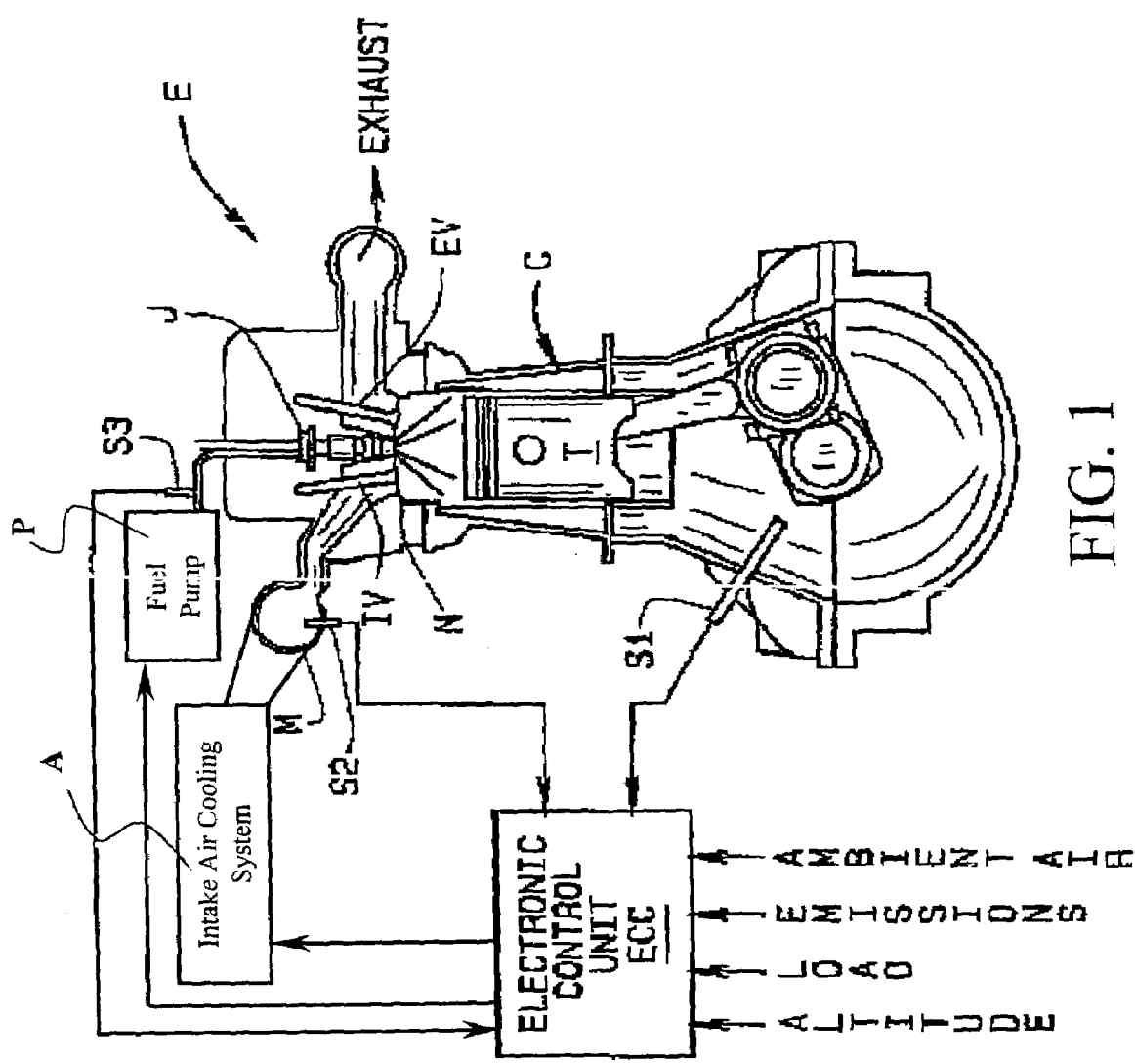
FIG. 1 is a simplified representation of a diesel engine, and a control system for the engine.

Referring to the drawings, a diesel engine E has a plurality of combustion chambers or cylinders C, only one of which is shown in FIG. 1. As is well known in the art, air at an elevated temperature flows through an intake manifold M and is drawn into the chamber through an intake valve IV and compressed by movement of a piston T. Air temperature in manifold M is controlled by an intake air cooling system A which includes, for example, a fan (not shown) and a fluid coolant (also not shown). Fuel supplied by a fuel pump P is injected into the chamber through the nozzle N of an injector J and the resulting air/fuel mixture is combusted. The products of combustion are then exhausted from the chamber through an exhaust valve EV. As noted previously, the exhaust emissions include hydrocarbons (HC), nitrogen oxides (NOx), carbon monoxide (CO), and particulate matter (PM). As also noted, the EPA establishes standards for these emissions which engine E must meet or exceed surpass in order to be acceptable for use.

An electronic control unit ECU controls overall engine E operation, including the injection of fuel into cylinder C. The ECU receives and is responsive to various inputs from the engine. In FIG. 1, three sensors S1–S3 respectively supply information as to engine position as a function of crankshaft location (S1), air temperature in manifold M (S2), and the pressure in the fuel line (S3). In addition to these inputs, other sensors (not shown) provide inputs with respect to the altitude at which the locomotive is operating, the load on the engine, ambient air temperature, and emission levels. The ECU controls fuel injection into the cylinder in response to these inputs.

Figure 2:
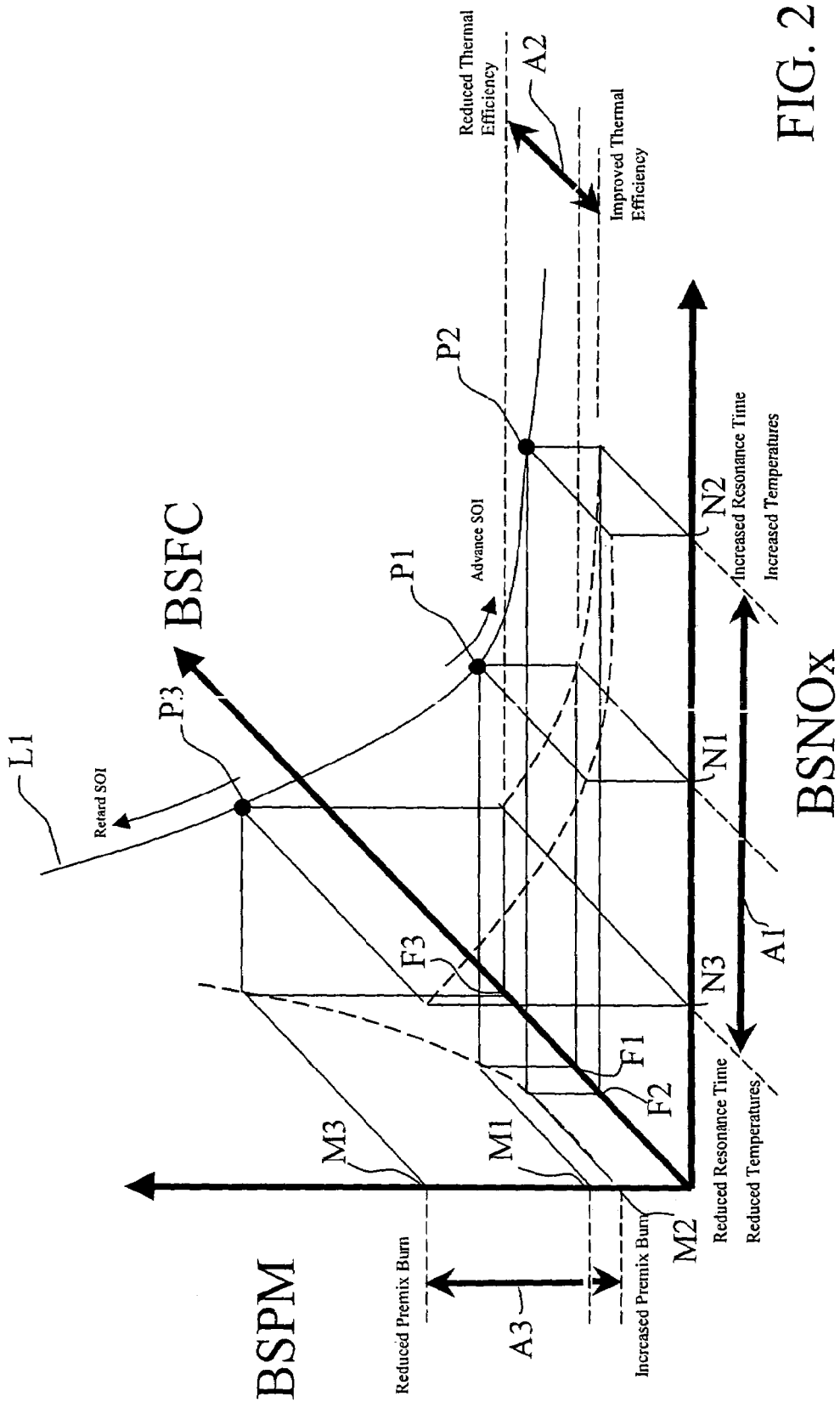
FIG. 2 is a three-dimensional chart plotting brake specific NOx (BSNOx), brake specific particulate matter (BSPM), and brake specific fuel consumption (BSFC) for a conventional set of engine operating conditions.

Referring to FIGS. 2–6, various changes or modifications to engine E or the manner in which air and fuel are supplied to cylinder C affect the resulting level of each type of emissions, as well as engine fuel economy and overall engine performance. In FIG. 2, a line L1 is a curve representing NOx and PM levels in an engine's exhaust, and engine fuel consumption, all for an initial set of engine operating conditions. By way of example, for a conventional engine E, the start of ignition injection (SOI) is 6Â° BTDC (before top dead center), and the engine's manifold air temperature is 150Â° F. (65Â° C.). The diameter of the hole in nozzle N is 0.46 mm (â□□01 in.), and the compression ration is 15.5:1. An engine operating with these parameters would define point P1 on curve L1 with respect to fuel consumption, and NOx, and PM values. In FIG. 2, the NOx, PM, and fuel consumption values are denoted on their respective axes at N1, M1, and F1.

If the start of ignition injection (SOI) is now advanced, engine operation will move to the right (as shown in FIG. 2) along line L1 to an operating point P2. The corresponding NOx, PM, and fuel consumption values are now denoted on their respective axes at N2, M2, and F2. As shown in FIG. 2, this change has the advantage of decreasing PM and fuel consumption; however, there is a significant increase in NOx. Conversely, if the SOI is retarded, so the engine operating point moves to the left along line L1 to point P3, the corresponding NOx, PM, and fuel consumption values are now denoted on their respective axes at N3, M3, and F3. This change has the effect of decreasing NOx, but PM and fuel consumption now substantially increase.

Further with respect to FIG. 2, with respect to each of the three factors comprising the graph, for an advanced SOI, the engine will have an increased resonance time and experience an increase in in-cylinder temperature, improved thermal efficiency, and an increased premix burn. For a retarded SOI, the engine will experience a reduced resonance time and a reduction in in-cylinder temperature, reduced thermal efficiency, and a reduced premix burn. These changes are represented by the respective arrows A1–A3 in FIG. 2.

Figure 3:
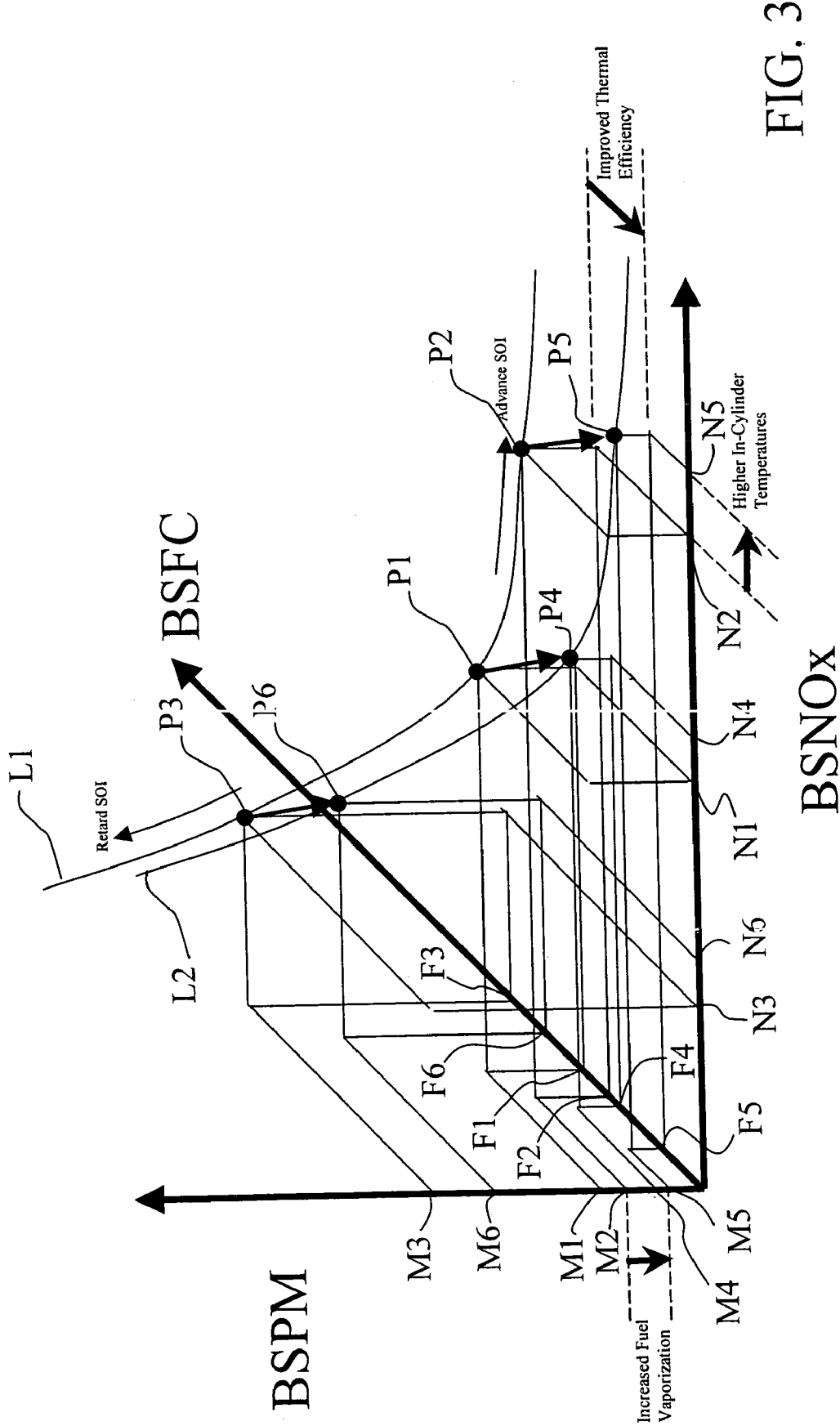
FIG. 3 is a chart similar to FIG. 2 illustrating the effect of a change in compression ratio.

Referring to FIG. 3, the effects on NOx, PM, and fuel consumption are checked with respect to changes in the compression ratio within cylinder C. If the-compression ratio is increased, the curve represented by line L1 shifts to become line L2 having data points P4–P6 corresponding to the data points P1–P3 on line L1. As indicated in that Fig., this shift results in improved thermal efficiency, higher in-cylinder temperatures, and an increase in fuel vaporization. If the SOI is advanced or retarded as previously discussed, the data points N1–N3, M1–M3, and F1–F3 are shifted to data points N4–N6, M4–M6, and F4–F6 respectively. The overall results are similar to those shown in FIG. 2. That is, advancing the SOI results in a decrease in PM and fuel consumption, but an increase in NOx. If SOI is retarded, the effect is to decrease NOx, but to increase PMs and fuel consumption.

Figure 4:
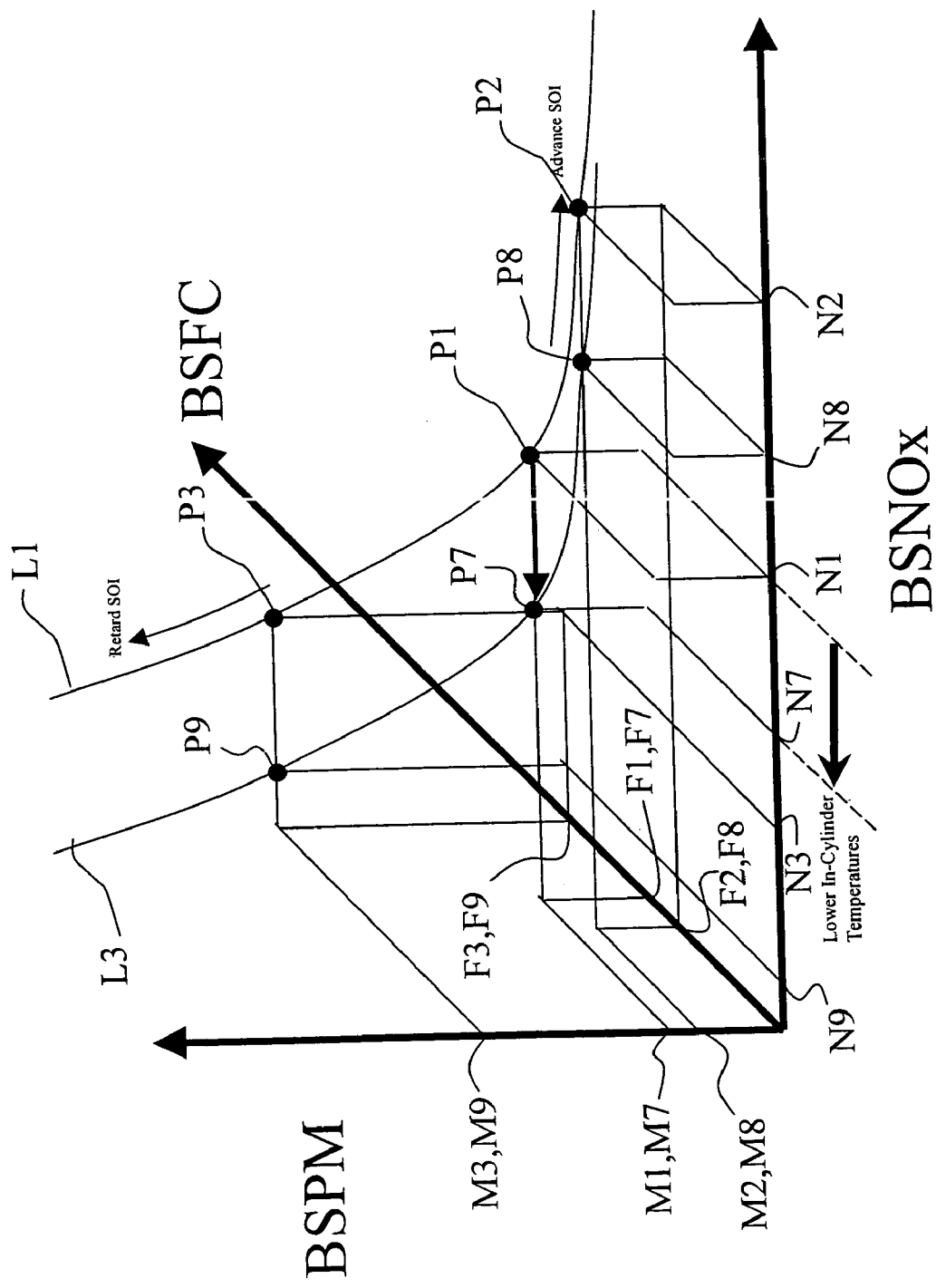
FIG. 4 is a chart similar to FIG. 2 illustrating the effect of intake manifold air temperature.

Now referring to FIG. 4, the effects on NOx, PM, and fuel consumption are considered with respect to changes in the intake manifold air temperature (MAT). If the manifold air intake temperature is reduced as indicated by the arrow, the curve represented by line L1 now shifts to become line L3 having data points P7–P9 corresponding to the points P1–P3 on line L1. This shift results in lower in-cylinder temperatures as indicated in the drawing. If the SOI is then advanced or retarded as previously discussed, the data points N7–N9, M7–M9, and F7–F9 are as indicated on the respective axes. The overall results of reducing MAT is shown to be a reduction in NOx. The effect of the temperature reduction with respect to both PM and fuel consumption is essentially minimal. As shown, the respective data points M7–M9 for particulate matter essentially correspond to the data points M1–M3, as do the data points F7–F9 and F1–F3 respectively for fuel consumption. Essentially, the reduction in NOx is due to lower in-cylinder temperatures because of the reduction in MAT, but this has minimal, if any, effect on reducing PM or lowering fuel consumption. Reducing the manifold air temperature is accomplished using intake air cooling system A. Electronic control unit ECU, in response to inputs from sensor S2, increases the fan speed, and/or increases the amount of coolant flow through the air cooling system to lower the air temperature from 150Â° F. to 120Â° F. or less, for example.

Figure 5:
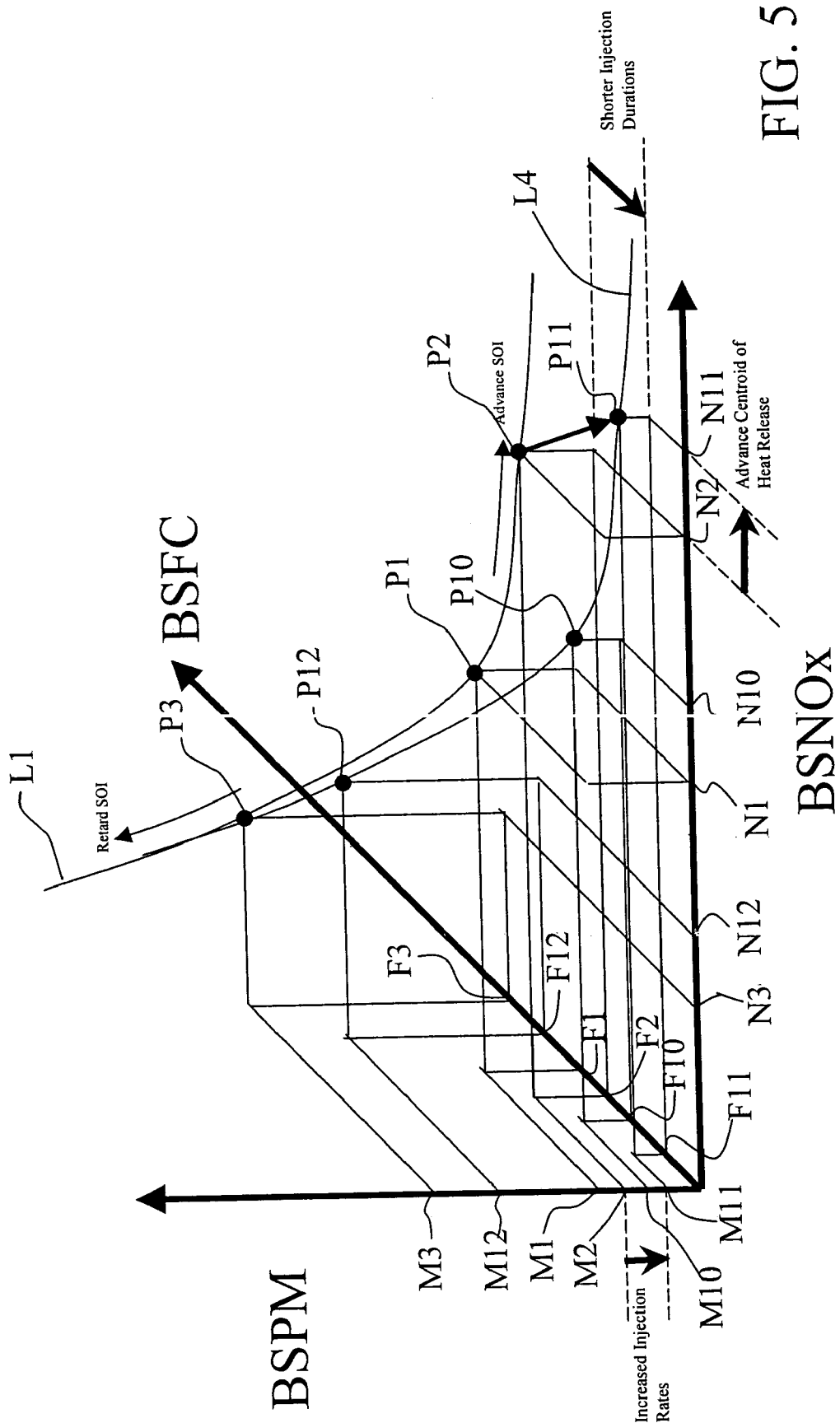
FIG. 5 is a chart similar to FIG. 2 illustrating the effect of a fuel injection pump pressure changes.

In FIG. 5, the effects on NOx, PM, and fuel consumption are observed with respect to changes in injection pressure. If the injection pressure is increased as indicated by the arrow in FIG. 5, the curve represented by line L1 now shifts to become line L4 having data points P10–P12 corresponding to the points P1–P3 on line L1. As further indicated in FIG. 5, increasing injection pressure results in a shorter duration of injections, increased injection rates, and an advance in the centroid of heat release. If the SOI is then advanced or retarded as previously discussed, the data points N10–N12, M10–M12, and F10–F12 are indicated on the respective axes BSNOx, BSPM, and BSFC. The changes resulting from increasing injection pressure are an increase in NOx for each position P10–P12 with respect to the corresponding position P1–P3. However, increasing injection pressure also results in significant reductions in both particulate matter and fuel consumption for each condition (i.e., initial SOI, increased SOI, retarded SOI). The respective data points M10–M12 for particulate matter are seen to be significantly lower than the corresponding data points M1–M3, as are the data points F10–F12 with respect to their corresponding data points F1–F3 for fuel consumption. Since the method of the invention is to reduce PM to meet the Tier 2 standards, increasing injection pressure is a way of doing so, while also lowering fuel consumption.

Figure 6:
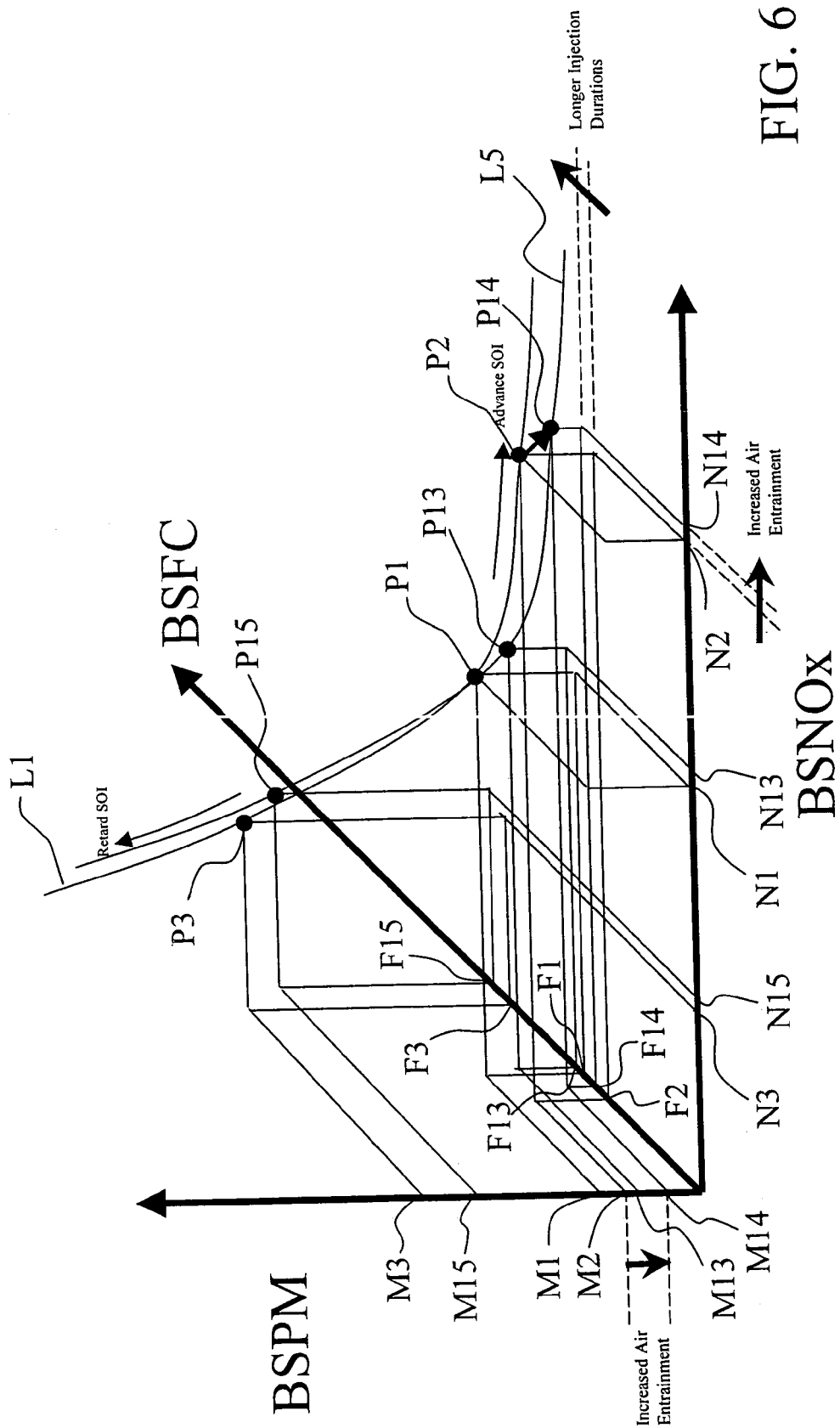
FIG. 6 is a chart similar to FIG. 2 illustrating the effect of changes in nozzle flow (hydraulic effect)

Referring to FIG. 6, the effects on NOx, PM, and fuel consumption are observed with respect to changes in nozzle flow. This change is effected by a change in the size of the diameter of nozzle N on fuel injector J in FIG. 1; or by a change in the shape of the nozzle which effects the fuel spray pattern. If there is a change in the nozzle so to reduce nozzle hydraulic flow, as indicated by the arrow in FIG. 6, the curve represented by line L1 shifts to the line L5 having data points P13–P15 corresponding to the points P1–P3 on line L1. Nozzle hydraulic flow is measured by having a constant pressure differential ($\Delta P$) across an orifice (the injector nozzle), and measuring fuel flow over a predetermined period of time. As further indicated in FIG. 6, reducing nozzle hydraulic flow results in a longer duration of injection and increased air entrainment. If the SOI is then advanced or retarded as previously discussed, the data points N13–N15, M13–M15, and F13–F15 are indicated on the axes BSNOx, BSPM, and BSFC respectively. The changes resulting from increasing injection pressure are an increase in NOx for each position P13–P15 with respect to the corresponding position P1–P3. However, for the positions P13–P15 on line L5 corresponding to points P1–P3 on line L1, there is a decrease in particulate matter. Importantly, the data points M13–M15 each show a significant lowering of PM with respect to the corresponding data points M1–M3; and, this decrease occurs regardless of whether the start of injection is advanced or retarded. Finally, the fuel consumption represented by points F13–F15 shows an increase in fuel with respect to the corresponding data points F1–F3.

Figure 8:
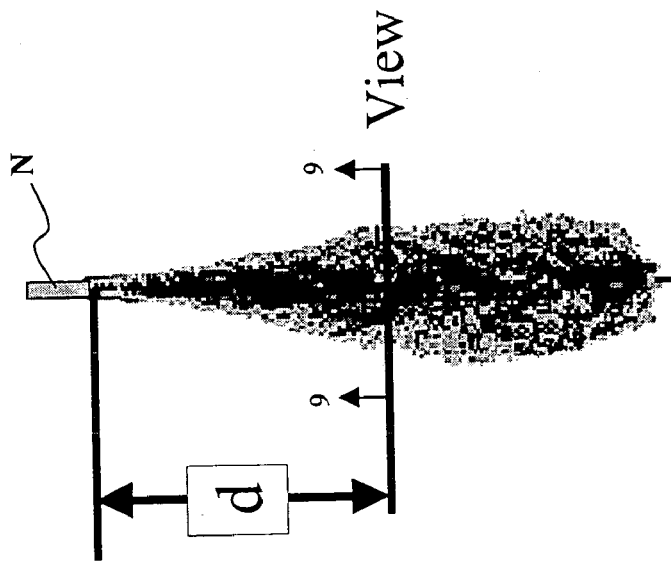
FIG. 8 illustrates a fuel spray pattern from an injector nozzle into the cylinder; and, FIG. 9 is a graph illustrating the equivalence ratio Î¦ for a cross-section of the fuel spray pattern a distance d into a cylinder from the injector nozzle, the pattern being shown for both conventional hydraulic flow, and for a reduced hydraulic flow in accordance with the teachings of the present invention.
Figure 9:
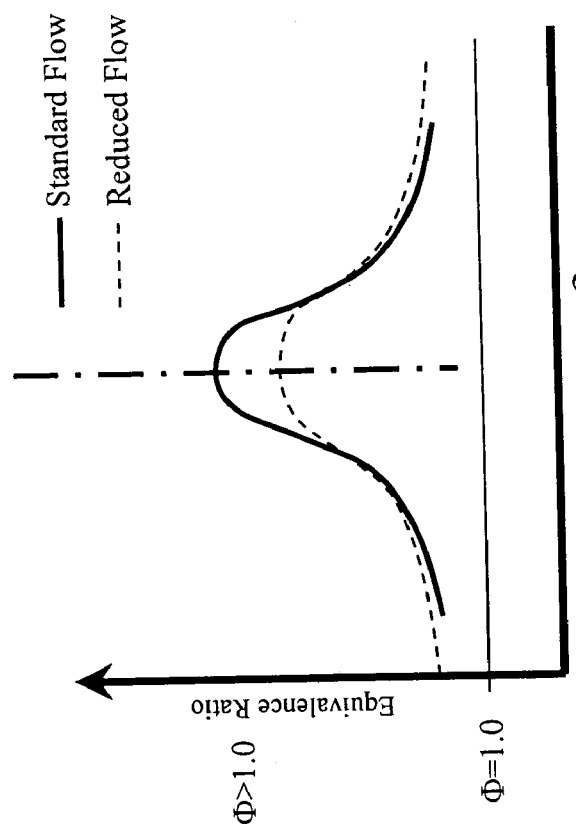

Referring to FIG. 8, a spray pattern from an injector J is shown. As indicated in the drawing, the spray pattern is evaluated at a distance d from the nozzle outlet. In FIG. 9, two spray patterns are shown as measured at d. The solid line spray pattern represents that from a conventional fuel injector nozzle; for example, a nozzle whose diameter is 0.46 mm. In accordance with the invention and with respect to the discussion relating to FIG. 6, the dotted line spray pattern is for fuel injector nozzle that produces a reduced hydraulic flow. This is achieved, for example, by reducing the nozzle diameter to 0.43 mm, or a reduction of approximately 12% in the spray area of the nozzle. The reduced hydraulic flow produced by reducing nozzle diameter is reflected in the lower equivalence ($\phi$) ratio shown in FIG. 9. In operation, the lower hydraulic flow characteristics produced by the nozzle are combined with an increase in injection velocity, and a longer duration of injection to achieved the desired result in emission levels.

Figure 7:
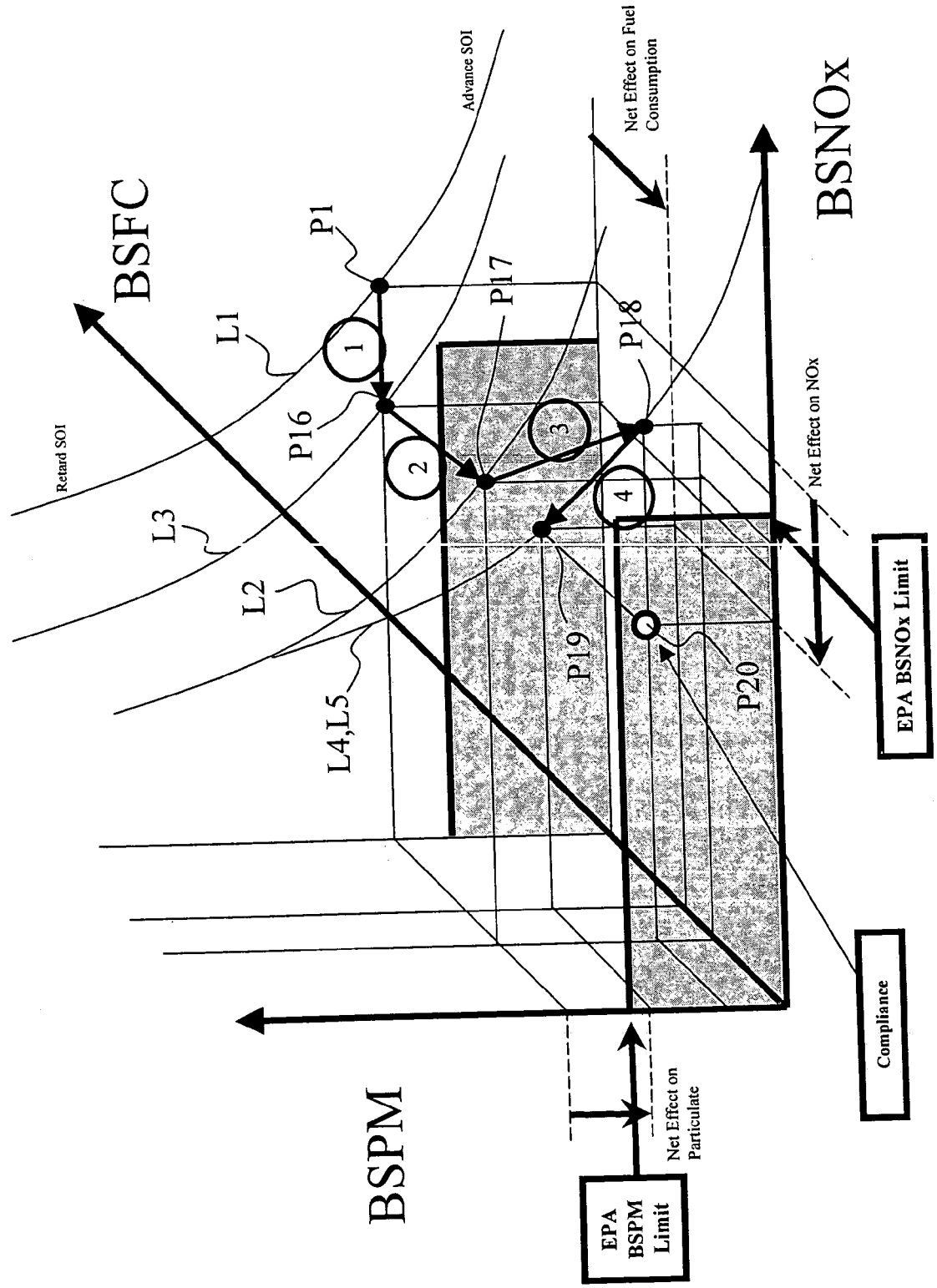
FIG. 7 is a chart similar to FIG. 2 showing the overall effect produced by the method of the invention to reduce PM to a level below EPA Tier 2 requirements, while maintaining NOx below the Tier 2 requirements and keeping fuel consumption at an acceptable level.

FIG. 7 represents a composite of the various steps discussed with respect to FIGS. 2–6. In accordance with the method of the invention, by combining the steps of changing the compression ratio (FIG. 3), intake manifold air temperature (FIG. 4), injection pressure effects (FIGS. 5 and 6), together with a change in the start of injection (SOI), the resulting PM level falls within the Tier 2 limits, as does NOx. In FIG. 7, the shaded rectangular area represents the EPA Tier 2 limits for both NOx and PM. By operating at a point within this shaded area, engine E will be in compliance with EPA requirements.

Specifically as shown in FIG. 7, the method of the invention first involves reducing intake manifold air temperature in the manner previously discussed. This lowering of air temperature is represented by the Step 1 arrow in which the engine operating point is moved from point P1 on line L1, to a point P16 on line L3. Next, the compression ratio is increased to a level above the 15.5:1 ratio for conventional diesel engines. This is represented by the Step 2 arrow in which the operating point is moved from point P16 to a point P17 on line L2. The third step, Step 3, is to increase injection pressure (nozzle hydraulic flow) which shifts the operating point from P17 to a point P18 on line L4, L5. This is accomplished as previously discussed with respect to FIGS. 8 and 9. Finally, if the SOI is now retarded, the operating point moves along line L4, L5 from point P18 to a point P19. When the location of this point is projected onto the BSNOx and BSPM axes, the point P20 is shown to be within the shaded rectangle representing Tier 2 compliance.

As indicated by the arrows in FIG. 7, by comparing the NOx, PM, and fuel consumption levels for points P1 and P19, the method of the invention has the net effect of i) reducing the NOx level so it moves from outside to within the Tier 2 compliance limits, ii) lowering the PM level so it also moves from outside to within the compliance limits, and iii) reducing fuel consumption. Those skilled in the art will appreciate that if MAT is not reduced, the engine will not be able to meet the NOx limit; that if the compression ratio is not increased, fuel consumption will not be reduced; that if nozzle hydraulic flow is not decreased, the particulate matter level cannot be reduced; and, that if SOI is not retarded, again, the engine will not meet the NOx limit.

By way of example, tests were performed to determine if the above noted steps of the method of the invention would result in NOx and PM levels being in compliance, and if the steps would also result in a reduction in fuel consumption levels. In the table below, the values given are approximate.

The results are as follows:

|  | Starting point (P1) | Compliance point (P19) |
|---|---|---|
| Start of Injection (SOI) | 6° BTDC | 3° BTDC |
| Intake Manifold Air Temp. (MAT) | 150° F. | 120° F. |
| Nozzle hole size | 0.46 mm (dia.) | 0.43 mm (dia.) |
| Compression ratio | 15.5 | 17.0 |

Finally, it is important to note that the method of the present invention achieves the Tier 2 requirements for NOx and PMs without having to otherwise treat the engine's exhaust. No scrubbers, filters, or other treatment devices need to be added to the engine to achieve the desired levels of emissions. The present invention, therefore, does not unduly add to the cost of the engine, its operation, or maintenance.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A diesel engine (E) for a railroad locomotive comprising:
   a combustion chamber (C) including a piston (T) movable in the chamber to achieve a compression ratio of greater than 15.5:1 and an air intake valve (IV) and an exhaust valve (EV) whose openings and closings are timed to movement of the piston;
   an injector (J) injecting fuel into the combustion chamber and having a nozzle (N) comprising a spray diameter of approximately 0.43 mm whose hydraulic flow characteristics effectively reduce particulate matter (PM) produced by combustion of an air-fuel mixture in the chamber to a level that meets Tier 2 requirements established by the Environmental Protection Agency (EPA) for such engines;
   sensors (S1–S3) sensing various engine operating parameters; and,
   an engine controller (ECU) responsive to inputs from the sensors as to a current operating status of the engine to control the injector to inject fuel into the cylinder beginning at approximately 3° before top dead center (TDC) so the particulate matter and other emissions (NOx) produced by the resulting combustion also meet Tier 2 requirements.

2. The diesel engine of claim 1 in which the reduced hydraulic flow characteristics of the nozzle are combined with an increase in injection velocity and the duration of fuel injection by the nozzle to reduce emission levels.

3. The diesel engine of claim 2 in which the injection velocity and duration of injection are controlled by the controller.

4. The diesel engine of claim 3 including a fuel pump (P) supplying pressurized fuel to the injector, and a sensor (S3) sensing the pressure within a fuel line supplying fuel to the injector, the controller being responsive to inputs from the injector to control the fuel pressure output of the fuel pump.

5. The diesel engine of claim 1 having an air intake manifold (M) whose sensed air temperature (MAT) is maintained at approximately 120° F., or less.

6. The diesel engine of claim 5 in which the air intake manifold temperature is maintained at approximately 120° F., or less, by an intake air cooling system (A) controlled by the controller in response to a temperature input from a sensor (S2).

7. The diesel engine of claim 1 in which the sensors used by the controller to control engine operating conditions sense at least one of the following engine parameters: engine crank shaft position, air intake manifold temperature, or pressure within a fuel line supplying fuel to the injector, the controller being responsive to an input from a sensor to control timing of fuel injection into a chamber.

8. The diesel engine of claim 7 in which the controller is further responsive to one of: the altitude at which the diesel engine is operating, a load pulled by the engine, ambient air temperature, or engine emission levels, to control the timing of fuel injection into the chamber.

9. In a diesel engine (E) for a railroad locomotive, the engine having a combustion chamber (C), a piston (T) movable in the chamber, and an air intake valve (IV) and an exhaust valve (EV) whose openings and closings are timed to movement of the piston, the improvement comprising an injector (J) injecting fuel into the combustion chamber and having a nozzle (N) comprising a diameter limited to approximately 0.43 mm whose hydraulic flow characteristics effectively reduce particulate matter (PM) produced by combustion of an air-fuel mixture in the chamber without having to treat the exhaust products from the engine.

10. The improvement of claim 9 further including at least one sensor (S1–S3) sensing an engine operating parameter and an engine controller (ECU) responsive to an input from the sensor to control injection of fuel into the cylinder to begin at approximately 3° before top dead center (TDC) so the particulate matter and oxides of nitrogen emissions (NOx) produced by the resulting combustion are controlled.

11. The improvement of claim 10 in which the sensors used by the controller to control engine operating conditions sense at least one of the following engine parameters: engine crank shaft position, air intake manifold temperature, or pressure within a fuel line supplying fuel to the injector, the controller being responsive to an input from a sensor to control timing of fuel injection into a chamber.

12. The improvement of claim 11 in which the controller is further responsive to one of: the altitude at which the diesel engine is operating, a load pulled by the engine, ambient air temperature, or engine emission levels, to control the timing of fuel injection into the chamber.

13. The improvement of claim 11 in which the air intake manifold temperature is maintained at approximately 120° F. by an intake air cooling system (A) controlled by the controller in response to a temperature input from a sensor (S2).

14. The improvement of claim 9 in which the hydraulic flow characteristics of the nozzle are combined with an increase in injection velocity and the duration of fuel injection by the nozzle to reduce emission levels.

15. The improvement of claim 14 in which the reduced hydraulic flow characteristics of the injector nozzle increases a ratio of the air to fuel during injection of fuel into the chamber through the nozzle to a ratio higher than that for a conventional diesel engine.

16. The improvement of claim 15 further including, increasing injection pressure of the fuel injected into the chamber, increasing the compression ratio within the chamber to greater than 15.5:1, and reducing the intake air manifold (M) temperature to approximately 120° F.

17. The improvement of claim 14 in which the injection velocity and duration of injection are controlled by the controller.

18. The improvement of claim 17 including a fuel pump (P) supplying pressurized fuel to the injector, and a sensor (S3) sensing the pressure within a fuel line supplying fuel to the injector, the controller being responsive to inputs from the injector to control the fuel pressure output of the fuel pump.

19. A method of controlling particulate matter (PM) and nitrogen oxide (NOx) emission levels within a diesel engine (E) for a railroad locomotive, the engine having a combustion chamber (C), a piston (T) movable in the chamber, an air intake valve (IV) and an exhaust valve (EV) whose openings and closings are timed to movement of the piston, and a nozzle (N) injecting fuel into the combustion chamber, the method comprising:

controlling hydraulic flow characteristics of an air/fuel mixture within the combustion chamber to effectively reduce particulate matter (PM) produced by combustion of the air-fuel mixture by controlling a flow diameter of the nozzle and by controlling injection pressure of fuel injected into the chamber; and increasing a compression ratio within the combustion chamber to greater than 15.5:1; and maintaining an intake manifold (M) air temperature (MAT) at less than approximately 120° F.

20. A diesel engine comprising:

an air intake apparatus comprising a manifold receiving air from an air cooling apparatus;

a combustion chamber defined by a cylinder and a piston moving within the cylinder comprise a compression ratio of at least 15.5:1, an intake valve delivering the air from the intake manifold to the combustion chamber in timed sequence with movement of the piston, and an exhaust valve for exhausting combustion gasses from the combustion chamber in timed sequence with movement of the piston;

a fuel system comprising a fuel pump delivering fuel at pressure through an injector comprising a nozzle diameter to the combustion chamber in timed sequence with movement of the piston; and a control unit associated with the air cooling apparatus to maintain the manifold air temperature to less than approximately 120° F.

21. The diesel engine of claim 20, further comprising a compression ratio of at least 17:1.

22. The diesel engine of claim 20, further comprising a control unit associated with the fuel system to control a start of fuel injection when the piston reaches approximately a 3° before top dead center position.

23. The diesel engine of claim 20, further comprising the nozzle diameter being approximately 0.43 mm.

* * * * *